United States Patent [19]

Parker

[11] Patent Number: 5,058,276
[45] Date of Patent: Oct. 22, 1991

[54] HEDGE TRIMMER

[76] Inventor: William H. Parker, 2813 Hurstview Dr., Hurst, Tex. 76054

[21] Appl. No.: 509,134

[22] Filed: Apr. 16, 1990

[51] Int. Cl.⁵ .................. B26B 15/00; B26B 13/00
[52] U.S. Cl. ........................................ 30/228; 30/229
[58] Field of Search ................ 30/226, 227, 228, 38, 30/30, 229

[56] References Cited

U.S. PATENT DOCUMENTS

| | | | |
|---|---|---|---|
| 3,408,875 | 11/1968 | Briskman et al. | 30/228 |
| 3,710,445 | 1/1973 | Roth | 30/228 |
| 3,757,194 | 9/1973 | Weber et al. | 30/228 |
| 4,756,085 | 7/1988 | Lebessis | 30/228 |

Primary Examiner—Douglas D. Watts
Assistant Examiner—Paul M. Heyrana, Sr.
Attorney, Agent, or Firm—Louis Bernat

[57] ABSTRACT

A drive for a hedge trimmer, or the like, stores energy in a clock spring during a part of each cycle of sickle-bar operation. When enough energy is stored in the clock spring, it is released to drive a sickle-bar with a strong chopping action.

13 Claims, 3 Drawing Sheets

HEDGE TRIMMER

This invention relates to reciprocating cutting machines and more particularly to sickle-bar hedge trimmers.

Sickle-bar cutters have been used for many years, perhaps since at least as early as Cyrus McCormick's reaper. Hand-held units (such as hedge trimmers) entered the market much later, perhaps sometime during, or just after, World War II. Generally, these hand-held units have been powered by an a.c. electric motor driven from commercial, electrical power lines. They are inherently dangerous because the sharp blades might inadvertently cut the power cord and produce at least an electric shock, perhaps injuring or even electrocuting the operator.

The inventive unit eliminates the shock hazard, improves the controllability of the appliance, and reduces the possibility of injury to the operator, especially shock hazard since it is battery powered. More particularly, the invention provides the following improvements: (1) a direct-current (d.c.) motor and a secondary battery pack which eliminates the power cord; (2) a spring which is wound during part of a cycle to accumulate mechanical energy which is used during another part of the machine cycle to deliver a sharp chopping stroke. The stored mechanical energy is delivered when peak power is required by the sickle-bar. The handle is located over the center of gravity in order to give a better control of the appliance, which reduces operator fatigue and thence the tendency to misdirect the tool.

Direct-current motors which run on batteries have many advantages over a.c. motors. First, a d.c. motor torque is maximum at or near stall or a momentary overload, when the shaft speed is being dragged down by a load. Alternating current motors generally do not produce comparable torque at or near stall. Thus, there is a self-control leading to the release of the stored spring energy when it is needed most. Second, d.c. motors produce more power per pound of motor as compared to a.c. motors. The power advantage may be as much as 4 to 1 in favor of the d.c. motor. A small d.c. motor and its battery may not weigh as much as an equivalent a.c. motor of equal useful power. Third, an elimination of the encumbering power cord makes the machine safer because the operator need not tend the cord and may concentrate on operating the machine.

However, the peak power consumption has limited the use of d.c. motors in these types of appliances. Thus, the invention improves the limitations by storing energy in a spring during part of a cycle and then releasing that stored energy at appropriate times during the cycle.

Accordingly, an object of this invention is to provide new and improved means for and methods of providing a sickle-bar cutter. Here, an object is to eliminate a need for an electrical power cord. In this connection, an object is to provide a maximum cutting power at a time in the machine cycle when it is most needed.

Another object of the invention is to provide a sickle-bar which has a maximum opening for receiving the object to be cut.

In keeping with an aspect of the invention, these and other objects are provided by a d.c. motor which drives two pitman gears or bell cranks through a central pinion gear. Two cutter blades are driven in opposing directions by the pitman pins in response to the rotation of the gears that are driven by the pinion. Two cam detents are located on diametrically opposite sides of one of the pitman gears. A roller of a spring-loaded cam follower engages a cam detent every half circle (180°) of rotation of this pitman gear. The pitman pins are held at rest at a point where the cam follower is engaged with one of the detents, while both pitman gears attempt to rotate clockwise in response to torque applied from the motor-driven pinion. The continued rotation of the pinion gear winds a clock spring. When the energy stored in the clock spring forces the spring-held cam follower out of the detent, each pitman pin travels over a semicircular path until its driven gear is again stopped by the other detent at the diametrically opposite point. Each pin moves in a slot in a cutter blade to translate the circular movements of the pitman pins into linear motion. This intermittent motion enables a spring to be wound during part of a cycle while an object to be cut is trapped in the teeth of a sickle-bar. The energy stored in the spring is then released when the sickle-bar is moved to chop the object (the branch).

A preferred object of the invention is shown in the attached drawings, wherein.

Figure 3:
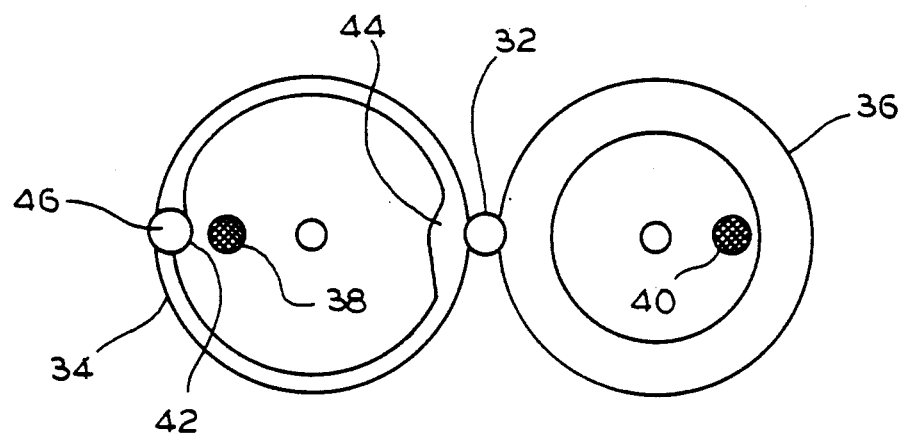
Figure 4:
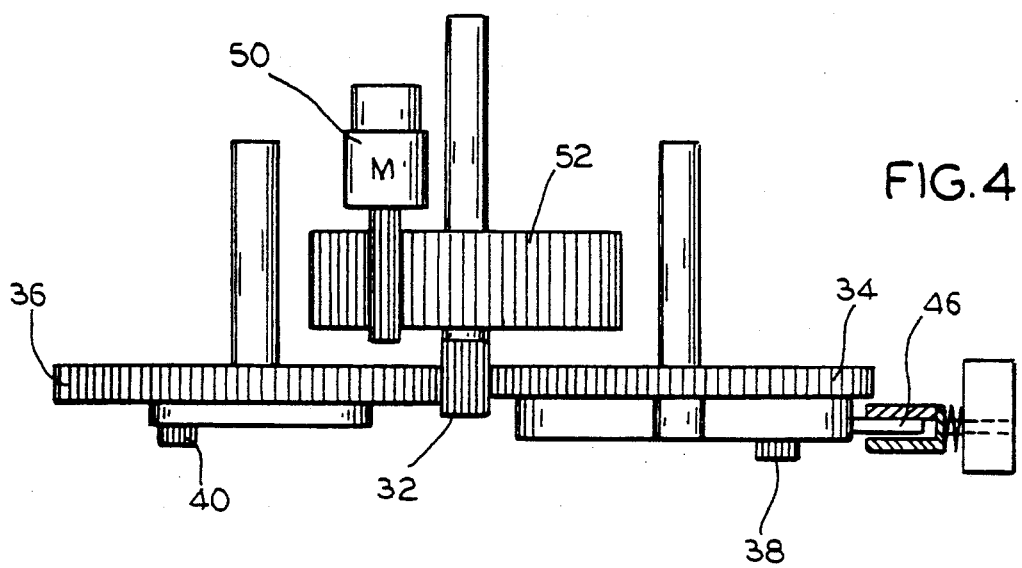
Figure 5:
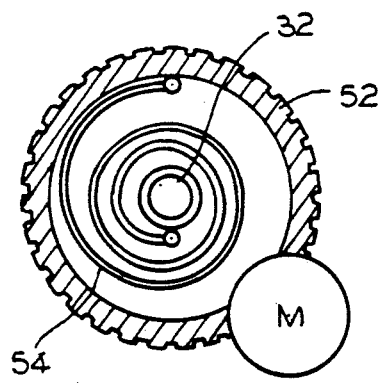
Figure 6:
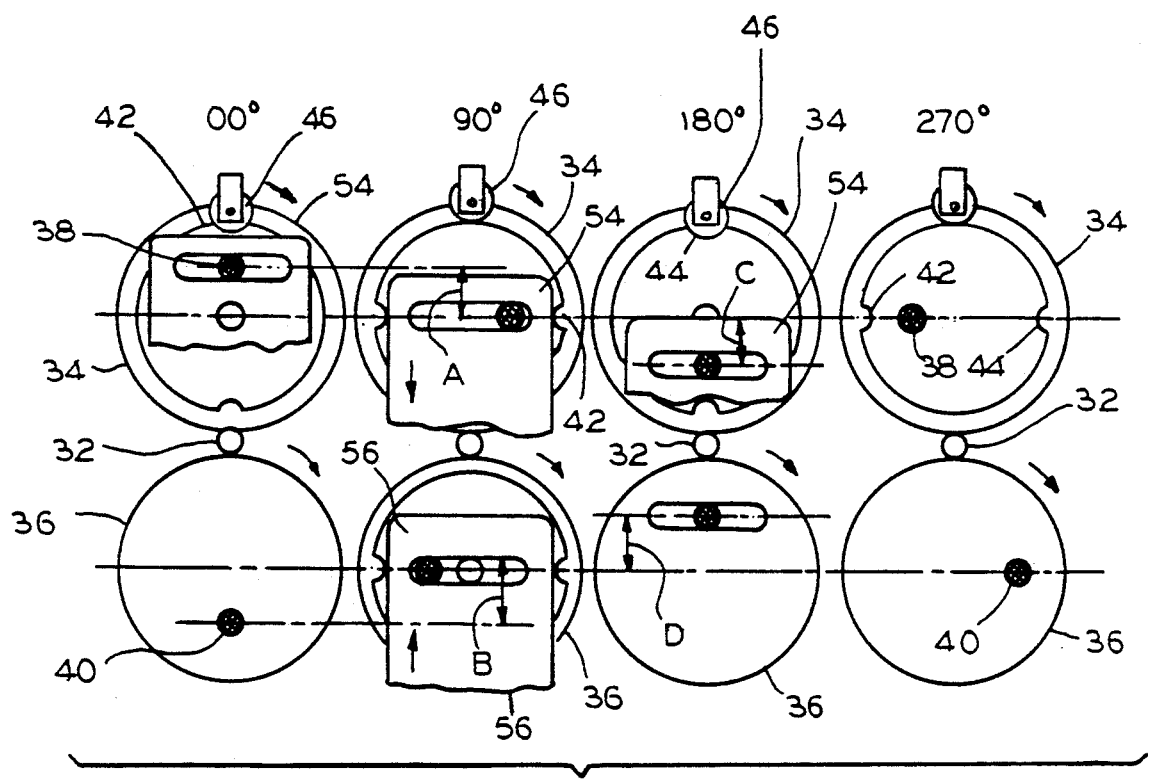
Figure 7:
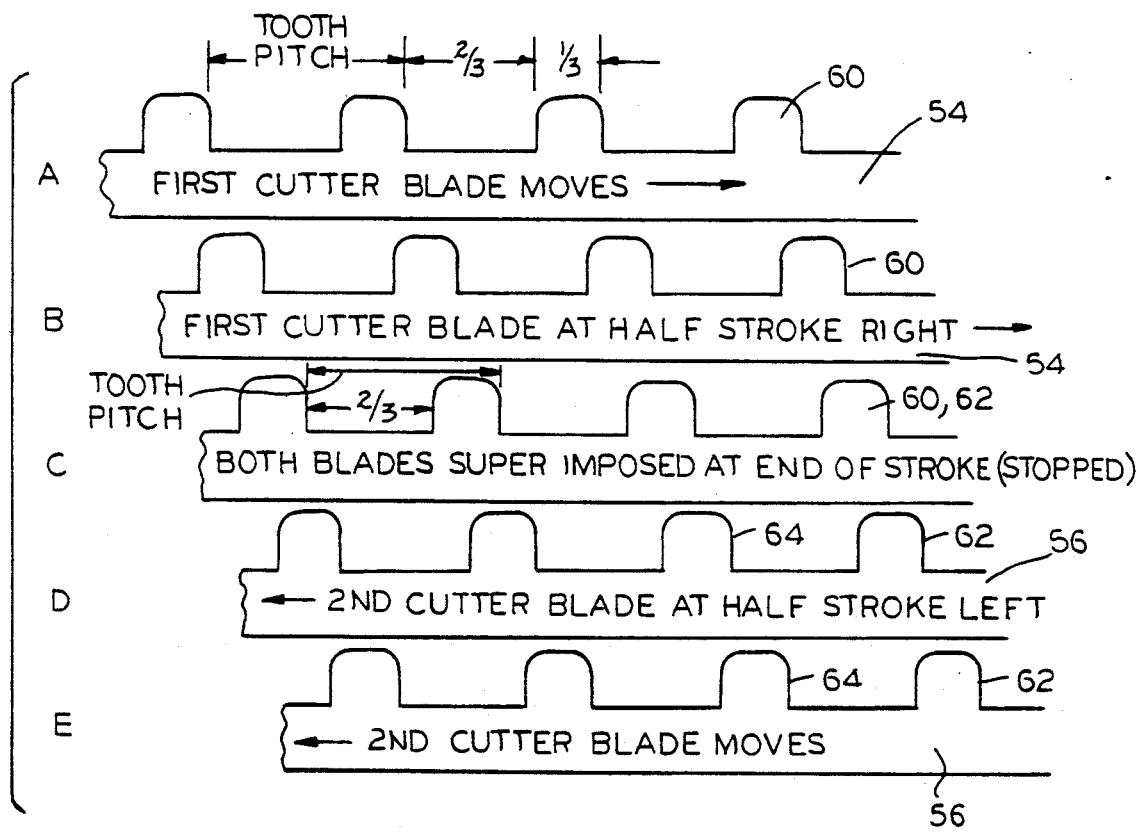
Figure 8:
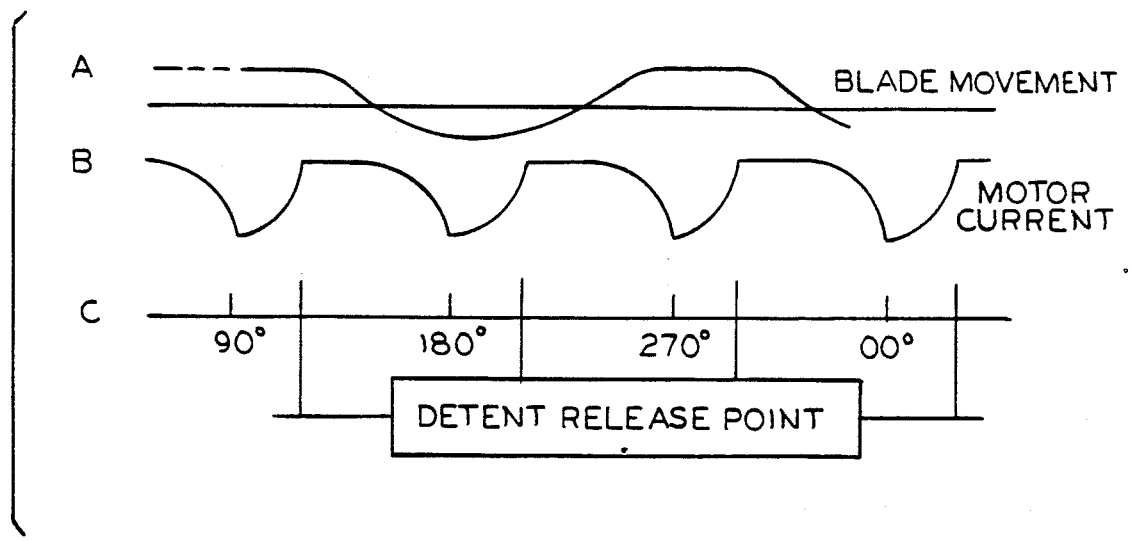

FIG. 3 schematically shows the layout of gears that provide the inventive action;

FIG. 4 is a side elevation of the gears of FIG. 3;

FIG. 5 is a plan view of the underside of a bull gear with the spring that is wound;

FIG. 6 illustrates four stop-motion views of the mechanical action which converts a mechanical action into a linear action;

FIG. 7 schematically shows the key five motion views illustrating how the sickle-bar moves; and FIG. 8 has graphs which illustrate the relationship between blade movement, motor current, and spring release.

Figure 2:
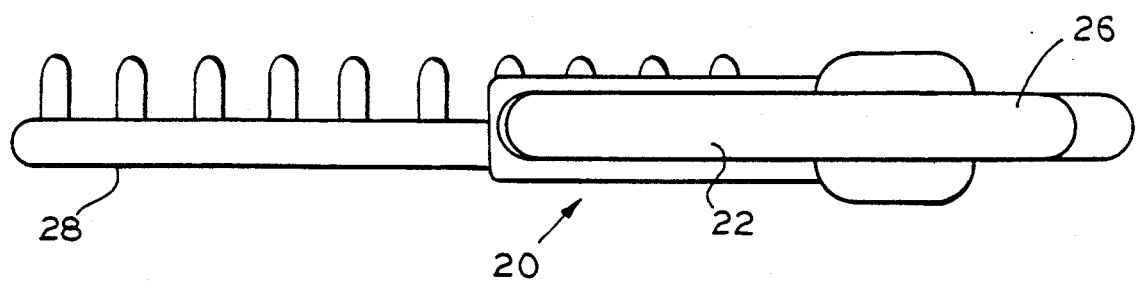
FIG. 2 is a top plan view of the sick-bar cutter of FIG. 1.
Figure 1:
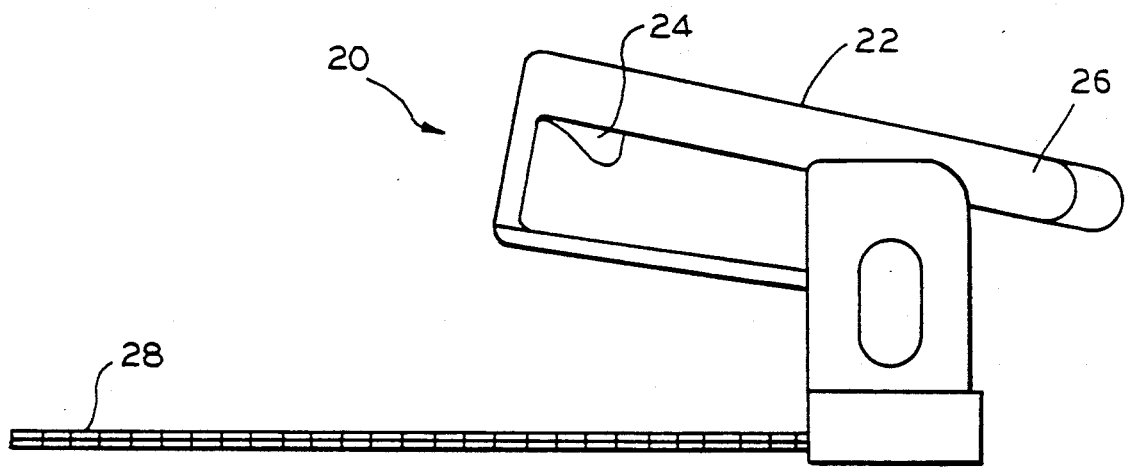
FIG. 1 is a side elevation of a hedge trimmer having a sickle-bar cutter incorporating the invention.

FIG. 1 is a drawing of a complete unit 20 incorporating the invention. The handle 22 contains the battery pack. Preferably, the handle is slanted to provide clearance for the operator's hand, while leaving space for cutting small branches. The trigger switch 24 is located so that the unit naturally balances in the hand, as it is being used. This reduces operator fatigue substantially. A stubby rear end 26 of the handle encourages a two-handed operation and thus helps reduce the possibility that an operator might injure the free hand while operating this appliance.

Cutter bar 28 has a length which is selected to balance the machine. The cutting edges of the blades generally have a taper of about 10° in order to assure a scissor action. Safety considerations make it preferable for the blade teeth to point away from right-handed persons, to protect them against personal injury. Preferably, an arrangement is provided at the base of the handle which enables the blades to be turned over to point in an opposite direction for left-handed operators. The complete unit should be in the order of about 24" long and weigh about 10–12 pounds.

Battery considerations suggest a use of six size "C" NiCad secondary cells. A charging connection should be included near the tail end 26 of the handle 22. The battery pack can be charged from any a.c. to d.c. charging unit; or, the entire battery pack may be removable to enable one set of batteries to be charged while the machine is in use, driven by another set of batteries.

The schematic (FIG. 3) showing of the invention illustrates a motor driven pinion gear 32 positioned between two circular gears 34, 36. Each of the gears 34, 36 has a pitman pin 38, 40 projecting therefrom. One of the wheels has an associated cam surface providing two detents 42, 44 for receiving and catching the roller 46 of a spring loaded cam follower. It can be seen that two cam followers could be used, installed diametrically opposite, and therefore, would substantially divide the shock impact which occurs when the cam follower drops into detent. Dual followers might share a "hairpin" spring in common.

Thus, the gear combination 34, 36 rotates through 180°, where it is stopped by the roller 46 dropping into a detent 42 or 44. This stops the rotation of gears 34, 36. The motor driven pinion 32 winds a clock spring until its tension overcomes the tension in the spring loaded cam follower 46. When this happens, the follower 46 pops out of the detent, thus releasing the tension in the wound-up clock spring. This rotates gears 34, 36 with their pitman pins 38, 40 and drives the sickle-bar cutter. As the tension in the wound-up clock spring is released by the rotation of the gears 34, 36, the tension in the spring loaded detent becomes dominant, stopping the mechanical motion when roller 46 drops into detent 44, after the gears 34, 36 have rotated by 180.

The actual mechanical structure is seen in FIG. 4 which is a side view of the gears represented in FIG. 1, together with the driving mechanism. The motor 50 turns a "bull" gear 52 at a substantially constant rate (rpm). FIG. 5 shows the underside of the bull gear 52. The pinion shaft 32 and the bull gear are coaxial and are interconnected by only the clock spring 54. When the roller 46 drops into a cam detent,. the clock spring 54 begins to wind, storing energy. When the spring biased locking action of the cam detent is overcome by the clock spring tension, the roller 46 jumps out of detent. The spring 54 and the motor 50 together propel the driven gears 34, 36 and everything moves. The motor and spring torsion is multiplied by the pinion-to-pitman gear ratio. The energy stored in the clock spring accelerates the sickle-bar cutter blades with a chopping action so that an impact improves the cutting of twigs or limbs, when the sharp blade edges meet in a scissoring motion.

Preferably, the spring 54 of FIG. 5 winds more than three complete turns before the spring winds "solid" If the ratio between the gears 34, 36 and pinion 32 is more than three turns for the clock spring windup, the spring will try to spin the pitman gears 34, 36 about 120° before the stored energy is expended and the spring is exhausted (relaxed) Thus, the cutting action should occur within 120° of a-pitman gear rotation while the spring is delivering its accumulated power. The spring is "unwound" when the roller drops into the next cam detent to stop the gear rotation and to speed the motor, adding efficiency. Meanwhile, the gear motor continues to add power to the system, constantly rewinding the clock spring.

FIG. 6 shows the driven gear sets 34, 36 in four stop motion, cardinal positions where the gears move the pitman pins 38, 40 through slots in order to translate a circular to a linear motion. The driven gears 34, 36 turn clockwise. Upper and lower slotted blade ends 54, 56 are shown in FIG. 6 to help illustrate the linear movements of the cutter blades 28 in response to rotation of the pinion shaft 32. As the gears 34, 36 turn by 90°, the upper blade 54 is pushed downwardly in a vertical direction over the distance A while the lower blade 56 moves upwardly half of the linear blade travel over the distance B. The rotation provides half of the blade movement. Note that, at the 90° position, the roller detent 46 has popped out of the detent 42 and is riding on the cam surface.

The sketch at 180° shows the roller 46 in the detent 44 which stops the movement. The detent action stops the rotary action while the spring "loads" or is wound again, in preparation for the return stroke. The return stroke is exactly like the first, except that the direction of the blade travel is reversed.

At the 180° and 360° (or 0°) points, the blades have made a full excursion A+C for blade 54 and B+D for blade 56. If the full travel is ¾", and blades move in opposite directions, the additive travel is $1\frac{1}{2}\infty$. With a blade tooth "pitch" (that is a tooth and gap) of 1½", the differential travel puts two teeth in opposition in the midstroke position if the teeth were superimposed when the stroke started. The advantages are that the gap between teeth (the place where candidate twigs and branches must enter to be cut) is a practical maximum. The tender new leaves need time to spring into the cutting zone. Thus, the temporary stopping of the blade motion gives an opportunity for entry of material to be cut.

The blades are accelerated at the beginning of a stroke, to help achieve a high blade velocity at the expected point of impact between blades and limb. At the instant of the shearing action, both the spring and the motor forces add in order to make a clean chopping impact. When the shearing action happens, the relative motion of both blades are twice the velocity of either blade, taken alone. The blades traverse to a new position in opposition to each other, at the end of a stroke, ready to cut again in a reverse direction on the next stroke. It is important to understand that the teeth of the two blades engage each other at midstroke as shown in FIG. 7C, and while in motion.

FIG. 7 schematically shows five stop motion views of the cutter bars 54, 56 and cutter blade teeth 60, 62. In greater detail, row C in FIG. 7 shows upper and lower sickle-bar blades 54, 56, respectively, as they stand at both 0 and 180° (as explained in FIG. 6). The teeth of the upper and lower blades are in register, superimposed one over the other. The difference is that the sickle-bars are displaced by one tooth pitch at 180° as compared to their position at 0°. Approximately one-third of the tooth pitch is filled with a sickle-bar tooth. The other two-thirds of the pitch is completely open to receive an item (twigs, limbs, leaves, etc.) which is to be cut.

As the roller 46 (FIG. 6) of the follower pops out of the detent 42, the upper bar 54 begins to move (downwardly in FIG. 6) toward the right, as shown in line A (FIG. 7). Simultaneously, the lower bar 56 begins to move (upwardly in FIG. 6) toward the left, as shown in line E (FIG. 7). The upper bar 54 continues to move toward the right (line B, FIG. 7) while lower bar 56 moves toward the left (line D). When tooth 60 is aligned over tooth 62 (line C), the bars 54, 56 stop as the roller 46 (FIG. 6) pops into the detent 44 at the 180° of rotation.

On the next half cycle, the direction of the bar motion reverses and the bars 54, 56 move back to their 0° position. At this time, the tooth 64 (FIG. 7) is aligned under the tooth 60 when the bars again come to rest, as shown in line C, FIG. 7.

FIG. 8 is a time chart which shows blade motion and motor current during the excursions of the sickle-bar blades over 90°-360° (0°) of motion. The blade motion (line A) can be seen after the detent release, which was preceded by a maximum motor effort. Motion is somewhat delayed when a branch is cut. The timing resumes at the next detent stoppage.

Motor current increases tremendously if the blades stall against a too heavy branch, at which time the operator should shut down the appliance. An automatic overcurrent shutdown with a push to reset button may be provided. The spring is wound any time the machine stalls. Release of the trigger switch or automatic shutdown causes the spring to unwind so that there is no stored energy which could cause the blades to unexpectedly chop something.

Those who are skilled in the art will readily perceive how the principles set forth above may be modified and adapted. Therefore, the appended claims are intended to cover all equivalent structures falling within the scope and the spirit of the invention.

I claim:

1. A drive for intermittently translating circular motion into reciprocal linear motion, said drive comprising a pair of rotary gears which are driven by a common pinion gear, spring biased means associated with said drive for cyclically stopping said pair of gears in at least one point in their rotation, spring means for continuously storing energy while said pair of gears is stopped, means responsive to said storage of said energy in said spring means overcoming the spring bias of said stopping means for releasing said stopped gears, said released gears being driven via said pinion gear by said energy stored in said spring means, until said stopping means again stops said pair of gears after said energy stored in said spring means is expended.

2. The drive of claim 1 wherein there are two diametrically opposed points associated with said pair of gears where said stopping means stops said gears and said spring means stores said energy.

3. The drive of claim 2 wherein said stopping means is a cam disk with diametrically opposed detents, and at least one spring biased cam follower which drops into said detents.

4. The drive of claim 3 and pitman pins on said pair of gears, a pair of sickle-bar blades having transverse slots therein, said pitman pins fitting into said slots in order to translate rotation of said gears into reciprocal linear motion of said sickle-bar.

5. The drive of claim 4 and battery means, handle means for supporting said drive, said sickle-bar, and battery means, said handle being located at approximately the center of gravity of said battery means, handle, and sickle-bar.

6. The drive of claim 5 and means associated with said handle for inducing a user to hold said handle with both hands.

7. The drive of claim 4 and means for inverting said sickle-bar with respect to said pitman pins, whereby said sickle-bar may be adapted for either left-handed or right-handed operators.

8. A hedge trimmer comprising a sickle-bar attached to a handle which is positioned over a center of gravity for said hedge trimmer, a drive assembly for converting a motor supplied energy into reciprocal linear energy for moving said sickle-bar, spring means, said drive assembly storing energy in said spring means in response to said motor supplied energy, means for cyclically and intermittently stopping said hedge trimmer while said energy is being stored in said spring, and means responsive to said energy stored in said spring reaching a threshold level for applying said energy stored in said spring to drive said sickle-bar with a chopping action.

9. The hedge trimmer of claim 8 wherein said motor is a battery driven d.c. motor and said means responsive to said threshold level applies said stored energy near a stalling point in the d.c. motor operation.

10. The hedge trimmer of claim 9 and means for inducing an operator to use two hands while using said trimmer.

11. A cyclically reciprocating cutting device which successively stores accumulations of energy to systematically increase the instantaneous apparent power applied to a mechanical system while substantially smoothing the input power consumption of the system.

12. The system of claim 11 further comprising a sickle-bar cutter and means for a clock spring improving a cutting action of said sickle-bar by stopping bar movement at an appropriate place in the machine cycle to store said accumulation of energy in said clock spring, and means for subsequently releasing said clock spring to produce an accentuated cutting action.

13. The system of claim 12 wherein said bar movement is stopped at points in the sickle-bar cycle which improves cutting action by leaving a cutting aperture of sickle-bar teeth open a longer time portion of the sickle-bar time cycle so that objects to be cut have a greater probability of entering the cutting aperture.

* * * * *

UNITED STATES PATENT AND TRADEMARK OFFICE
CERTIFICATE OF CORRECTION

PATENT NO. : 5,058,276
DATED : October 22, 1991
INVENTOR(S) : William H. Parker

It is certified that error appears in the above-identified patent and that said Letters Patent is hereby corrected as shown below:

Col. 3, line 16, delete reference numeral "32";

line 26, "180" should be corrected to read —180°—;

line 52, after "(relaxed)" insert a period (.);

line 53, between "a" and "pitman" delete the dash line.

Col. 4, line 16, after "1-1/2" the infinity symbol should be deleted and an inch symbol inserted therefor.

Signed and Sealed this

Thirteenth Day of April, 1993

*Attest:*

STEPHEN G. KUNIN

*Attesting Officer*      *Acting Commissioner of Patents and Trademarks*